(12) United States Patent
Hou et al.

(10) Patent No.: US 8,132,051 B2
(45) Date of Patent: Mar. 6, 2012

(54) METHOD AND SYSTEM FOR SAMPLING INPUT DATA

(75) Inventors: Rui Hou, Beijing (CN); Zhi Yu Liu, Beijing (CN); Huayong Wang, Beijing (CN); Yan Qi Wang, Beijing (CN); Qiong Zou, Beijing (CN); Yao Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/767,862

(22) Filed: Apr. 27, 2010

(65) Prior Publication Data

US 2010/0281310 A1  Nov. 4, 2010

(30) Foreign Application Priority Data

Apr. 30, 2009 (CN) .......................... 2009 1 0136950

(51) Int. Cl.
*G06F 11/00* (2006.01)
(52) U.S. Cl. .......................................... 714/28; 714/45
(58) Field of Classification Search .................... 714/28, 714/29, 30, 33, 37, 39, 45
See application file for complete search history.

(56) References Cited

U.S. PATENT DOCUMENTS

| | | | |
|---|---|---|---|
| 7,386,839 B1 | 6/2008 | Golender et al. | |
| 7,457,872 B2 | 11/2008 | Aton et al. | |
| 7,457,923 B1* | 11/2008 | Chou et al. | 711/137 |
| 2008/0114870 A1* | 5/2008 | Pu | 709/224 |
| 2008/0288929 A1* | 11/2008 | He et al. | 717/153 |
| 2009/0265695 A1* | 10/2009 | Karino | 717/131 |
| 2010/0149185 A1* | 6/2010 | Capewell et al. | 345/426 |

FOREIGN PATENT DOCUMENTS

WO  WO 2008/050094 A1  5/2008

OTHER PUBLICATIONS

Lisa Amini et al., "SPC: A Distributed, Scalable Platform for Data Mining," symposium, 2006, 27-37, Philadelphia, Pennsylvania.
Joseph Lancaster et al, "Understanding the Performance of Streaming Applications Deployed on Hybrid Systems," IEEE symposium, Apr. 2008, 1-5, Miami, FL.
M. Timmerman, "A Knowledge-Based Approach for the Debugging of Real-Time Multiprocessor Systems," IEEE symposium, May 1993, 23-28, New York, NY.
Kwangyong Lee, "A Development of Remote Tracepoint Debugger for Run-time Monitoring and Debugging of Timing Constraints on Qplus-P RTOS," IEEE symposium, May 2003, 93, Japan.

* cited by examiner

*Primary Examiner* — Dieu-Minh Le
(74) *Attorney, Agent, or Firm* — Vazken Alexanian

(57) ABSTRACT

A method and system for sampling input data. The method includes: buffering input data; recording an execution path of the buffered input data in an online operation module; determining whether the buffered input data passes through a desired execution path, and responsive to the buffered input data passing through the desired execution path, sampling the buffered input data to a data set. The system includes: buffering means for buffering input data; recording means for recording an execution path; sampling means for determining whether the buffered input data passes through a desired execution path.

20 Claims, 4 Drawing Sheets

METHOD AND SYSTEM FOR SAMPLING INPUT DATA

CROSS-REFERENCE TO RELATED APPLICATION

This application claims priority under 35 U.S.C. §119 from Chinese Patent Application No. 200910136950.6 filed Apr. 30, 2009, the entire contents of which are incorporated by reference herein.

BACKGROUND OF THE INVENTION

1. Field of the Invention

The present invention relates to an application testing field. More particularly, the present invention relates to a method and system for sampling the input data.

2. Description of the Related Art

Streaming processing is a high performance computing mode requiring conducting real-time processing on mass data, which has characteristics such as real time and mass input data, for example. Use of streaming processing enables input data to be received from a data source and the received data to be processed at the same time. Meanwhile, the processed data can be outputted at the same time. With the streaming processing technology, advantages such as improving throughput, shortening response time, and reducing storage overhead of the system, can be achieved.

In the prior art, streaming processing has been widely applied, for example, algorithm trading in e-commerce services, RFID (Radio Frequency Identification) event handing application, fraud detection application, process monitoring application, and location-based service application in the telecommunications system, which all relate to streaming application of streaming processing.

Different from a common application, streaming application is typically a lasting and long-run application. Thus, when error occurs to the streaming application and only affects a part of the streaming application, it is typically expected to debug an operator (that is, an operation module in the streaming processing for analyzing and processing data) in the corresponding streaming application without stopping the whole streaming application.

However, based on the prior art, the speed of the operation module running in the debugging mode is much lower than the running speed in the on-line execution mode. Thus, it is difficult to execute debugging to a particular operator in the case of not affecting the streaming application.

In addition, in the prior art, it mainly relies on manual analysis and experience to design a test case, which is not easy for inexperienced people. In other words, the effectiveness of the test case is, to a great extent, dependent on the capability and experience level of manual analysis.

Besides the streaming application, other applications, which have mass input data, also involve the above similar problem.

SUMMARY OF THE INVENTION

To this end, the present invention provides a method and system for sampling input data.

According to an aspect of the present invention, there is provided a method for sampling input data. The method includes the steps of: buffering input data; recording an execution path of the buffered input data in an on-line operation module; determining whether the buffered input data passes through a desired execution path, and responsive to the buffered input data passing through the desired execution path, sampling the buffered input data to a data set.

According to another aspect of the present invention, there is provided a system for sampling input data. The system includes: buffering means for buffering input data; recording means for recording an execution path of the buffered input data in an on-line operation module; and sampling means for determining whether the buffered input data passes through a desired execution path, and responsive to the buffered input data passing through the desired execution path, sampling the buffered input data to a data set.

Through the method and system according to embodiments of the present invention, input data can be sampled based on the execution path, to thereby automatically form a data set, which, for example can be used as a test suite. Thus, formation of a test suite will not rely on human analysis capability and expertise level, and further, work efficiency is improved and effectiveness of the test suite is enhanced. In addition, the input data sampled in the test suite is all input data in practical application and thus in better conformity with the circumstance of practical application. Furthermore, the obtained test suite can be provided to an offline version of the operation module for debugging, and thus the operation module can be debugged in the case of not stopping the on-line application.

BRIEF DESCRIPTION OF THE ACCOMPANYING DRAWINGS

The above and other features according to embodiments of the present invention will become more apparent through the detailed description of the embodiments as shown in the accompanying drawings. In the accompanying drawings according to embodiments of the present invention, like reference numbers indicate the same or similar components.

Figure 6:
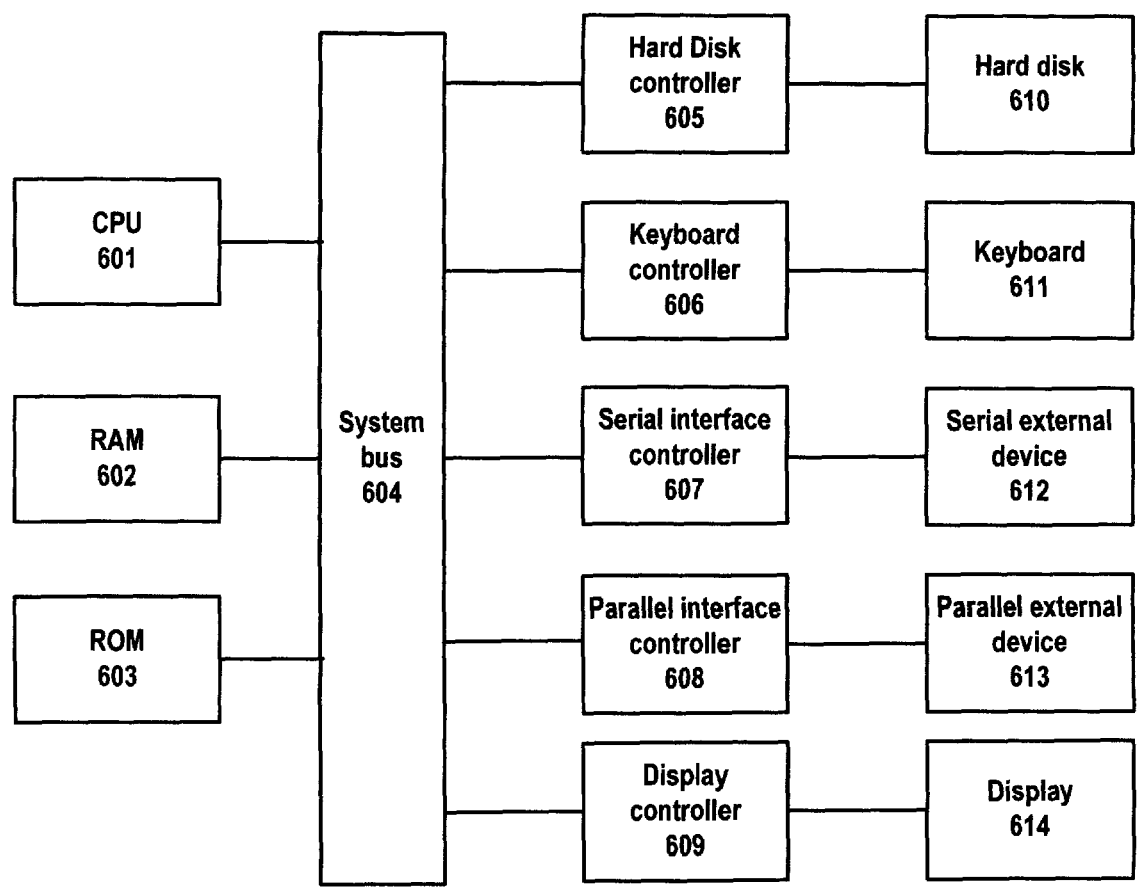

FIG. 6 schematically shows a structural block diagram of a computing device in which embodiments of the present invention can be implemented.

DETAILED DESCRIPTION OF THE PREFERRED EMBODIMENTS

Hereinafter, a method and system for sampling input data according to the present invention will be described in detail with reference to the accompanying drawings.

Figure 1:
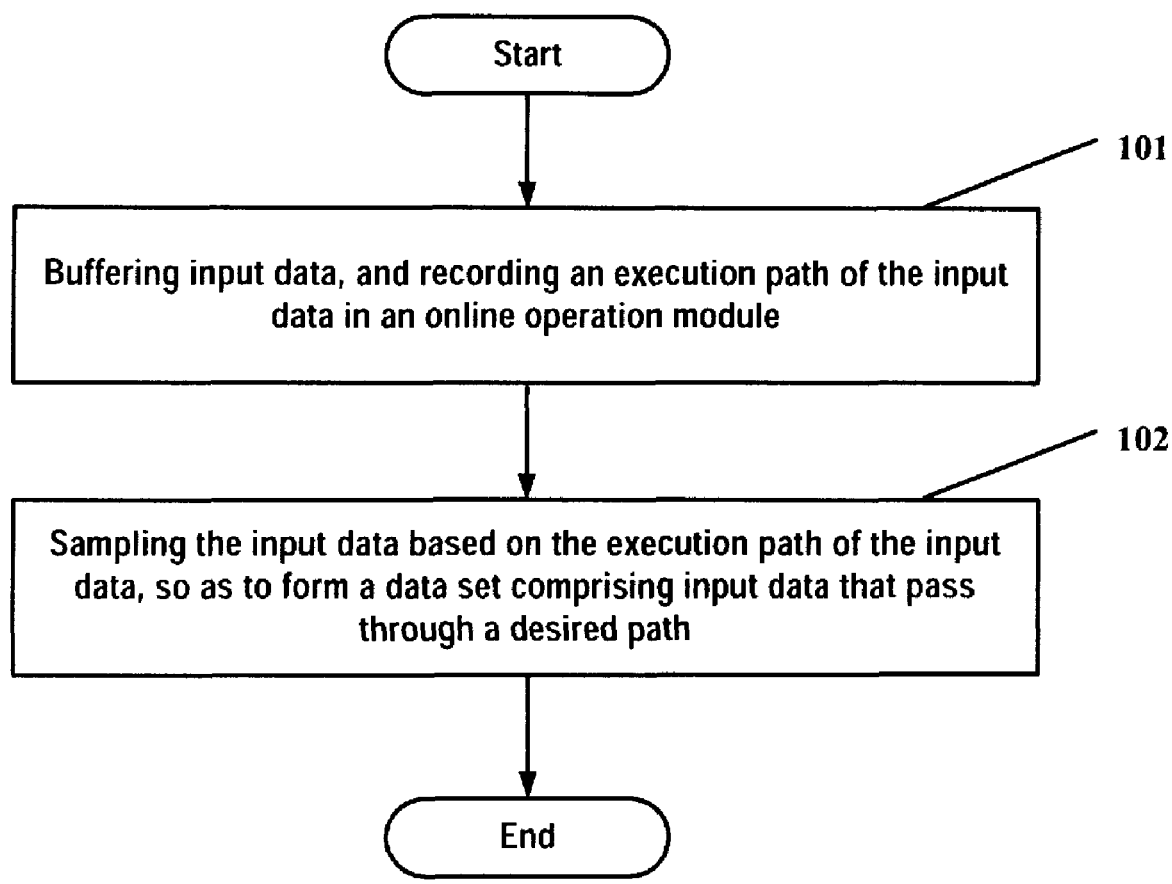
FIG. 1 shows a flowchart of a method for sampling input data according to an embodiment of the present invention.

First, reference will be made to FIG. 1 to describe a method for sampling input data according to an embodiment of the present invention in detail. FIG. 1 shows a flowchart of a method for sampling input data according to an embodiment of the present invention.

As shown in FIG. 1, at step 101, for an operation module in an online running application, the execution path of the input data is recorded.

The execution path is the path through which input data passes during the period of being processed in the operation module. In each operation module, there are typically various branch points, such as determining statements, n-conditional branch statements, and function call. Thus, different input data may pass through different branches at these branch points. The branches through which input data passes form an execution path of the input data as a whole.

Recording the execution path of input data can be implemented in many ways. Hereinafter, a plurality of embodiments will be described in an exemplary way.

According to one embodiment of the present invention, the value of the input data at each branch point in the operation module program can be tracked and recorded so as to determine whether to jump at each branch point. Then, a set of branch points which jump indicates the execution path of the input data. The branch points can be those relevant to determining statements, n-conditional branch statements, or function call, for example. In this way, the execution path of the input data in the program can be recorded.

Figure 2:
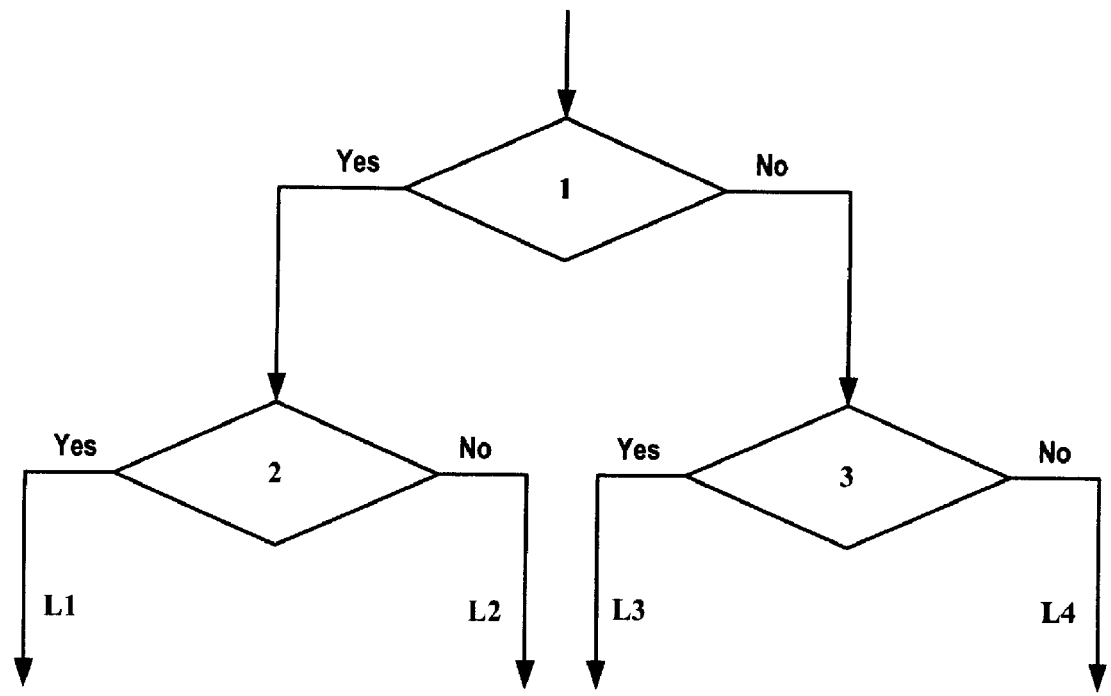
FIG. 2 shows a schematic diagram of a method for recording an execution path according to an embodiment of the present invention.

FIG. 2 shows a diagram of a method for recording an execution path according to the embodiment. As shown in FIG. 2, there are three branch points, that is, point 1, point 2, and point 3. A path marked as "Yes" indicates the path where jump occurs at the corresponding branch point, and a path marked as "No" indicates the path where no jump occurs at the corresponding branch point.

From FIG. 2, it can be seen that there are 4 execution paths L1, L2, L3 and L4 arranged from left to right. If the input data passes through the execution path L1, then because input data jumps both at point 1 and point 2, its execution path can be indicated by a set (1, 2) including branch points 1 and 2. If the input data passes through the execution path L2, then because the input data jumps at point 1 and does not jump at point 2, its execution path can be indicated by a set (1) including the branch point 1. If the input data passes through the execution path L3, then because the input data does not jump at point 1 but jumps at the point 3, its execution path can be indicated by a set (3) including the branch point 3. If the input data passes through the execution path L4, then because the input data does not jump at any point, its execution path can be indicated by null set (null) not including any branch point.

It should be noted that such execution path recording manner is more accurate, but it occupies greater storage space, and requires more time for recording.

In another embodiment of the present invention, the granularity for recording the execution path can be adjusted based on the application requirement. In each operation module, there are typically a great number of branches having a relatively low significance with respect to the overall execution path, such as branches with a deeper level, and branches with lower differential degrees, which can be neglected. Thus, only the values of particular branch points in the operation module program are recorded, without considering other branch points with less significance. This simplified recording manner can save storage space and reduce recording time.

In an embodiment according to the present invention, the granularity for recording an execution path can be adjusted based on at least one of the size of the storage device, the expected recording time, and the amount of data passing through the execution path. For example, the granularity can be manually adjusted based on any one of the size of the storage device or the expected recording time before starting to record or during the recording. For a large storage device, a finer granularity can be used. For a small storage device, a greater granularity can be used. For a shorter expected recording time, a greater granularity can be used. If a longer recording time is acceptable, a finer granularity can be used.

In addition, for example, during the recording, a granularity for recording execution path can also be dynamically adjusted based on the amount of input data that passes through the execution path. In an embodiment, first, the execution path is recorded with a greater granularity. When, for example, it is found that the amount of data passing through the currently recorded execution path is relatively large, the execution path is recorded with a relatively finer granularity, to distinguish each sub-path inside the execution path thereby. Further, when it is found that the amount of data passing through some currently recorded execution paths is relatively small these execution paths can be recorded with a relatively larger granularity. According to another embodiment of the present invention, the granularity for recording an execution path can be adjusted for the particular execution path. For example, for one or more execution paths, which are regarded to be more suspicious, finer granularity can be set; for execution paths which are regarded to be less possible for error, greater granularity can be set.

Besides the manner of recording an execution path by means of branch points as described above, other manners can also be used to record the execution path of input data. According to a further embodiment of the present invention, instrumentation can be used to record the execution path of input data. As well-known in the field of software testing, instrumentation technology is a technology to obtain the runtime information of the program by adding statements for recording information into source codes. With the instrumentation technology, a great amount of mark posts can be inserted in the operation module program. These mark posts can be inserted in the path between branch points, not necessarily inserted in branch points. By reasonably setting the mark posts inserted in the program, a set of mark posts can be used to indicate each path. During the program execution, the execution path of the input data can be obtained by recording the marks posts through which the input data passes.

Figure 3:
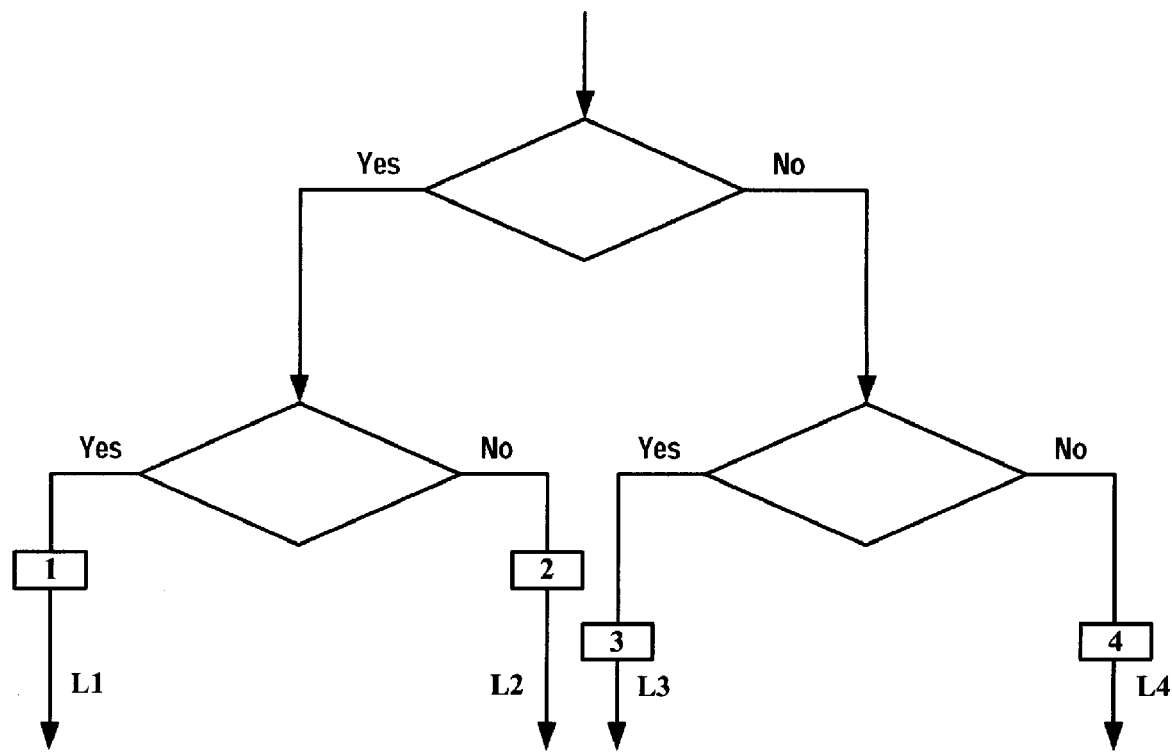
FIG. 3 shows a schematic diagram of a method for recording an execution path according to another embodiment of the present invention.

FIG. 3 shows a schematic diagram of a method for recording the execution path with instrumentation according to the embodiment of the present invention. Similar to FIG. 2, FIG. 3 includes four execution paths L1, L2, L3, and L4 arranged from left to right. As shown in FIG. 3, if the input data passes through the execution path L1, then because the input data passes through the mark post 1, its execution path can be indicated by a set (1) including the mark post 1. Similarly, if the input data passes through the execution path L2, then its execution path can be indicated by a set (2) including a mark post 2. For example, if the input data passes through the execution path L3, its execution path can be indicated by a set (3) including a mark post 3. If the input data passes through the execution path L4, its execution path can be indicated by a set (4) including a mark post 4.

Those skilled in the art should appreciate that, in the schematic diagram as shown in FIG. 3, each path can be uniquely marked by a mark post. However, in the actual application, the path may be very complex and typically needs to be indicated by a set including a great amount of mark posts. Thus, mark posts can be inserted appropriately so as to be able to effectively mark each path, and meanwhile the mark posts to be used should be as less as possible so as to reduce the storage space.

In the above embodiments, recording the execution path is mainly implemented by software. It should be noted that the recording can also be implemented at hardware level.

According to an embodiment of the present invention, the execution path for the input data is recorded through a pipeline inside a processor. For example, as far as the Power system structure of the International Business Corporation (IBM) is concerned, the pipeline is a major component inside the processor to execute instructions. The pipeline can include a plurality of pipe stages, wherein the last stage is typically called a commit stage. All instructions go through the commit stage, and whether the input data jumps can be known in this commit stage. Thus, the commit stage in the pipeline can be modified so as to record information such as the address of an instruction and whether jump occurs when finding each instruction, and to thereby record the execution path of the input data.

In the case of recording by means of hardware, hardware buffer can be increased so as to store the recorded information. When, for example, hardware buffer is full or is to be full, an interruption can be generated. Response to the interruption, information in the hardware buffer can be saved in an appropriate position, and the hardware buffer is cleaned for subsequent recording. Besides, bloom filter, a typical component in the computer system structure, can also be used to store the recorded information. Bloom filter is a simple and space-efficient random data structure. Though it is not perfect in precision, it can store mass information, and thus can be used for storing the recorded information.

According to the present invention, it is typically required to record the execution path of the input data for a particular operation module in the application, that is, a part of the whole application. Thus, measures need to be taken to enable the control of recording. In the case of recording by means of software, whether to implement recording can be determined by determining whether branch points and mark posts are in a particular operation module. However, in the case of implementing recording by means of hardware, a control switch can be set so as to control the beginning and end of recording. For example, a control register can be set so as to implement control of recording through setting the values of the control register when arriving at the instruction required to be recorded and leaving from the instruction required to be recorded.

It should be noted that other manners known in the prior art can also be used to record the execution path of the input data.

Hereinafter, returning to FIG. 1, it will continue the description of the method for sampling the input data according to the present invention.

As shown in FIG. 1, at step 102, input data is sampled based on the execution path of the input data so as to form a data set including the sampled input data.

According to an embodiment of the present invention, buffer means is set to store a certain amount of input data. The certain amount needs to be designed to at least guarantee that the input data is still saved in the buffer means when the execution path of the input data is obtained, so as to determine whether to sample the input data based on the execution path. Preferably, the buffering means can use the first-in first-out storage manner.

Thus, after obtaining the execution path of the input data through recording at step 101, whether to sample the input data still saved in the buffer means can be determined based on the execution path. If it is required to sample the input data, the input data can be duplicated from the buffer area or extracted to the storage area for storing the sampled data. If sampling is not required, the input data can be neglected, or deleted from the buffer means so as to provide more space for other input data.

In an embodiment according to the present invention, input data can be sampled such that the sampled input data have different execution paths. Preferably, the execution path of the sampled input data can cover all execution paths as much as possible for a particular operation module, which needs to be debugged or tested.

According to a further embodiment of the present invention, the input data can be sampled such that the sampled input data only relates to one or more designated execution paths, thereby obtaining the input data related to the designated execution path (s). For example, upon determining that a problem possibly occurs to one or more paths of the operation module and it is necessary to collectively debug or test these paths, this situation may arise. An appropriate user interface can be provided so as to facilitate a user to designate these paths.

Strategies for sampling the input data can be various. Hereinafter, several kinds thereof will be described schematically.

According to one embodiment of the present invention, a relatively high sampling weight can be used to sample the input data whose execution path has a relatively low appearing frequency. Among all execution paths of the operation module, some execution paths will have a great amount of input data to pass through, thus the frequency of their appearing is relatively high. Some execution paths have less data to pass through, thus the frequency of their appearing is relatively low. For the execution paths with a relatively high frequency of appearing, it is much easier to sample the input data related to the execution path. For those execution paths with a relatively lower frequency of appearing, the amount of input data related thereto is also much smaller. Thus, the input data whose execution path has a relatively low appearing frequency can be sampled with a relatively high sampling weight so as to obtain utmost sampling data related to the execution path. For example, the input data whose execution path has a relatively low appearing frequency can be sampled with a relatively high sampling rate whereas the input data whose execution path has a relatively high appearing frequency can be sampled with a relatively low sampling rate.

For the purpose of explanation, this embodiment will be described hereinafter by means of instance. For example, for 1000 input data of the execution paths L1, L2, L3 and L4 as shown in FIG. 2, 800 data passes through the execution path L1, 150 data passes through the execution path 2, 30 data passes through execution path 3, and 20 data passes through the execution path 4. Thus, as far as the 1000 data are concerned, the frequencies for occurrence of these execution paths are 800, 150, 30, and 20, respectively. Thus, the input data that passes through the execution path 4 can be sampled with a sampling rate 1, that is, collecting all; the input data that passes through the execution path 3 is sampled with a sampling rate 2/3; the input data that passes through the execution path 2 is sampled with a sampling rate 2/15; and the input data that passes through the execution path 1 is sampled with a sampling rate 1/40. In this way, 20 input data related to each execution path can be obtained respectively.

It should be noted that the above instance is only for the purpose of explanation, and the present invention is not limited thereto.

According to a still further embodiment of the present invention, a relatively higher sampling priority can be used to sample newer input data among input data that have an identical execution path. For example, for data with the same execution path, a first-in first-out manner can be used to store the data obtained from sampling, and when there is new sampling data, the currently stored earliest sampling data is discarded, such that the data in the data set is all newer data.

In an embodiment of the present invention, the obtained data set can be used as the test suite for debugging so as to be provided to the offline running application for the purpose of debugging or testing.

In the embodiments as mentioned above, the application is preferably a streaming application. For a streaming application, the input of each operation module is typically a stream including infinite stream data objects with identical structures. Thus, it is not realistic to debug each in such stream input data. Furthermore, the operation module in the streaming application, that is, the operator, is also stateless, which means the processing to each stream data object has no relation with other stream data objects. Thus, according to the embodiments of the present invention, it is advantageous to sample only a part of them so as to automatically form a data set for testing.

Those skilled in the art should appreciate that the application can also be other application similar to the streaming application and having a great amount of data.

In a preferred embodiment, the Characteristic Value of Execution Path (CVEP) of the input data can be further computed based on the execution path of the recorded input data, such that the execution path of the input data is uniquely marked by the CVEP, thereby sampling the input data based on the CVEP.

In the preferred embodiment, the set S is a set of branch points $p_1, p_2, \ldots, p_n$ which need to be recorded, wherein n is the number of branch points. For each stream data object $SDO_k$, its execution path $P_k$ is a set of points $p_{k1}, p_{k2}, \ldots, p_{km}$, that is, $P_k = \{p_{k1}, p_{k2}, \ldots, p_{km}\}$, wherein $p_{k1}, p_{k2}, \ldots, p_{km}$ are branch points where stream data object $SDO_k$ jumps among the branch points $p_1, p_2, \ldots, p_n$. Then, based on the following formula, the Characteristic Value of Execution Path (CVEP) can be computed through a proper hash function:

$$CVEP(k) = H(p_{k1}) V H(p_{k2}) V \ldots V H(p_{km})$$

wherein, hash function $H(x)$ is a mapping for mapping a point to a bit vector, and "V" represents an OR operation.

Next, an instance of how to compute the CVEP based on the recorded execution path is described with continuing reference to the method for recording an execution path as shown in FIG. 2 and FIG. 3.

In the case of adopting the recording method as shown in FIG. 2, the execution paths L1, L2, L3, and L4 are indicated by set (1, 2), set (1), set (3), and null set (null), respectively.

In this instance, hash function $H(x) = 1 << x-1$ is used, that is, shift 1 left for x−1 bits.

If the input data 1 passes through the execution path L1, because it is indicated by the set (1, 2) that passes through the branch points, the CVEP of input data 1 can be computed with the following formula:

$$CVEP(1) = H(1) V H(2) = (01) V (10) = 11$$

In other words, logic OR operation is executed to the value obtained after hashing each node in the set.

Similarly, if the input data 2 and 3 pass through the execution paths L2 and L3, respectively, the CVEPs of the input data 2 and 3 are as follows:
CVEP(2)=H(1)=1
CVEP(3)=H(3)=100

If the input data 4 passes through the execution path L4, then because the execution path L4 is indicated by a null branch point set, it is not necessary to be hashed, thus the CVEP of the input data 4 is 0, that is,
CVEP(4)=0

In this way, the CVEP for each execution path can be worked out. Thus, the execution path can be indicated by the CVEP so that the input data is sampled based on the execution path.

Further, as shown in FIG. 3, in the case of recording the execution path by means of instrumentation, the four paths L1, L2, L3, and L4 are indicated by sets (1), (2), (3), and (4) of mark posts, respectively. Thus, the CVEPs of execution paths can be computed likewise with the above hash function. The obtained CVEPs for the input data 1, 2, 3, and 4 are as follows:
CVPE (1)=1
CVEP (2)=10
CVPE (3)=100
CVEP (4)=1000

In actual application, the execution path may be much more complex than what is shown in FIG. 3. Thus, mark posts can be inserted appropriately to reduce the storage space and decrease the computing time and computing complexity.

However, it should be noted that the above-mentioned hash function is only for the purpose of illustration, and the present invention is not limited thereto. Any other forms of hash functions can be adopted as long as they can uniquely identify each execution path.

It should be noted that computing CVEP is not essential. In an embodiment of the present invention, an execution path is represented by an ordered sequence of branch points of the input data where jump occurs. For example, the execution path L1 in FIG. 2 is indicated by the sequence "1, 2", and the execution path L2 is indicated by the sequence "1"; for the execution path L3, it is indicated by the sequence "3"; while for the execution path L4, it is represented by a null sequence. In this way, by comparing the above ordered sequence, the input data can be sampled likewise based on the execution path.

In another preferred embodiment, a CVEP weight can be computed, and then the input data is sampled based on the CVEP weight, so as to implement the embodiment of sampling the input data whose execution path has a relatively low appearing frequency with a relatively high sampling weight. Hereinafter, how to compute the CVEP and sample the input data based on the CVEP will be described.

Suppose there are three jump points, respectively called point 1, point 2, and point 3. Among 500 input data that have been recorded, there are 490 data jumping only at point 1 and point 3, 5 data jumping only at point 2 and point 3, and 5 data jumping only at point 1, point 2, and point 5. Thus, the total amount of data jumping at point 1 is 495, the total amount of data jumping at point 2 is 10, and the total amount of data jumping at point 3 is 500.

Moreover, based on the above algorithm, with the hash function $H(x) = 1 << x - 1$, for the 490 data jumping at point 1 and point 3, the CVEP of its execution path is H (1)VH (3)=(001)V(100)=101. Similarly, for 5 data jumping at point 2 and point 3, its execution path is 110, and 5 data jumping at point 1, point 2, and point 3, its execution path is 111.

Next, the CVEP weight can be computed based on the data amount of each execution path and the amount of data jumping at each point.

For each execution path, its CVEP weight is the amount of data passing through the execution path divided by the total sum of the amount of data jumping at each branch point consisting of the execution path. For example, for the execution path with the CVEP as "101", its CVEP weight is 490/(495+500)=490/995. Similarly, for the execution path with a CVEP as "110", its CVEP weight is 5/(10+500)=5/510. For the execution path with a CVEP as "111", its CVEP weight is 5/(495+10+500)=5/(1005).

Then, the input data is sampled based on the CVEP weight. The greater the CVEP weight is, the relatively lower sampling weight is used to sample for the corresponding execution path, while the lower the CVEP weight is, the relatively larger sampling weight is used to sample so as to obtain more input data.

Table 1 shows the corresponding CVEPs, CVEP weights, and sampled data.

| CVEP | CVEP weight | sampled data |
| --- | --- | --- |
| 101 | (490, 995) | s500, s499, s498, s497, s496, |
| 110 | (5, 510) | s495, s334, s256, s162, s78 |
| 111 | (5, 1005) | s490, s295, s273, s124, s12 |

From the above table, it is seen that for execution paths with a lower CVEP weight, that is, the execution paths with a CVEP of "110" and "111", all input data that appear are recorded. For the execution path with a CVEP of "101", only 5 inputs which appear in the last among 490 input data is recorded.

It should be noted that the CVEP weight reflects more precisely the appearing frequency of the execution paths, which can further differentiate the execution paths with the same appearing times.

By virtue of the method for sampling the input data according to the present invention, the input data can be sampled based on the execution path, thereby further automatically forming a data set as a test suite. In this way, formation of the test suite will not depend on the human analysis capability and experience level, which further enhances the working efficiency and improves the effectiveness of the test suite. Moreover, because the input data in the test suite obtained from sampling is all input data in practical application, it is in better conformity with the circumstances of practical application. Besides, the obtained test suite can be used in off-line running application for debugging. Thus, it can debug the operation module without stopping the online application.

Next, an instance of a system for sampling the input data according to the present invention will be described with reference to FIGS. 4 and 5.

Figure 4:
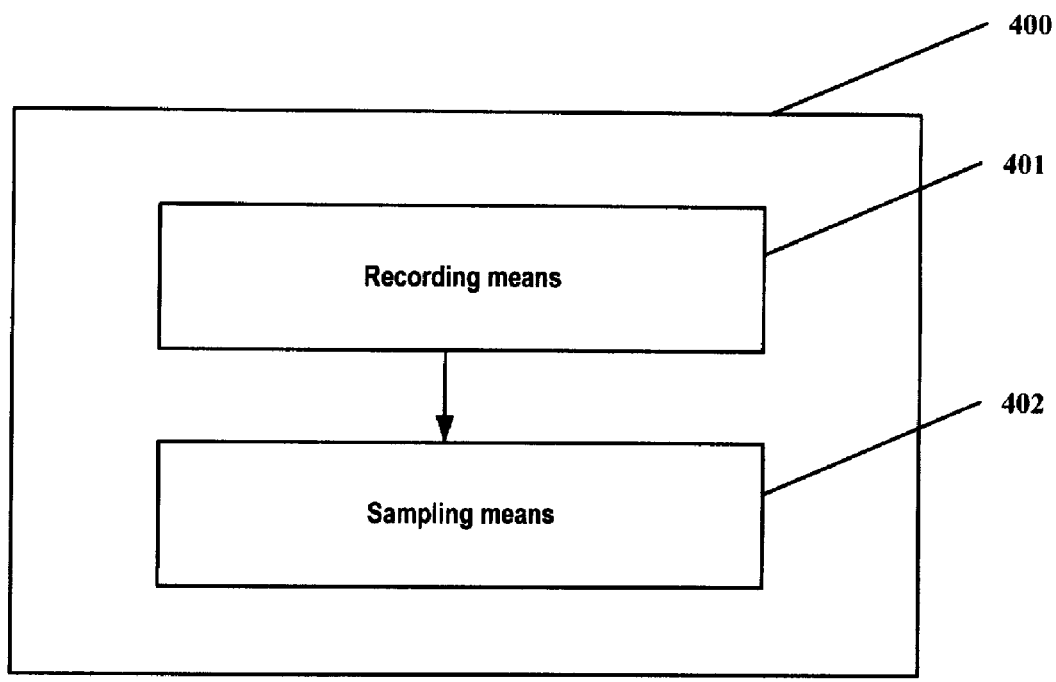
FIG. 4 shows a block diagram of a system for sampling input data according to an embodiment of the present invention.

FIG. 4 shows a system 400 for sampling the input data according to an embodiment of the present invention. As shown in FIG. 4, a system 400 includes: recording means 401 configured for recording execution paths of input data for an operation module in an online running application; and sampling means 402 configured for sampling the input data based on the execution paths of the input data, so as to form a data set including the sampled input data. In FIG. 4, the previously mentioned buffer means is omitted.

According to an embodiment of the present invention, the data set includes input data having different execution paths.

According to another embodiment of the present invention, the data set includes input data having one or more designated execution paths.

According to a further embodiment of the present invention, the sampling means can be further configured to: sample the input data whose execution path has a lower appearing frequency with a relatively high sampling weight; and/or sample newer input data among input data which have identical execution path with a relatively high sampling priority.

According to a still further embodiment of the present invention, the data set can be provided to an offline running application, so as to debug the application with the data set.

According to a yet further embodiment, the application can be streaming application.

Figure 5:
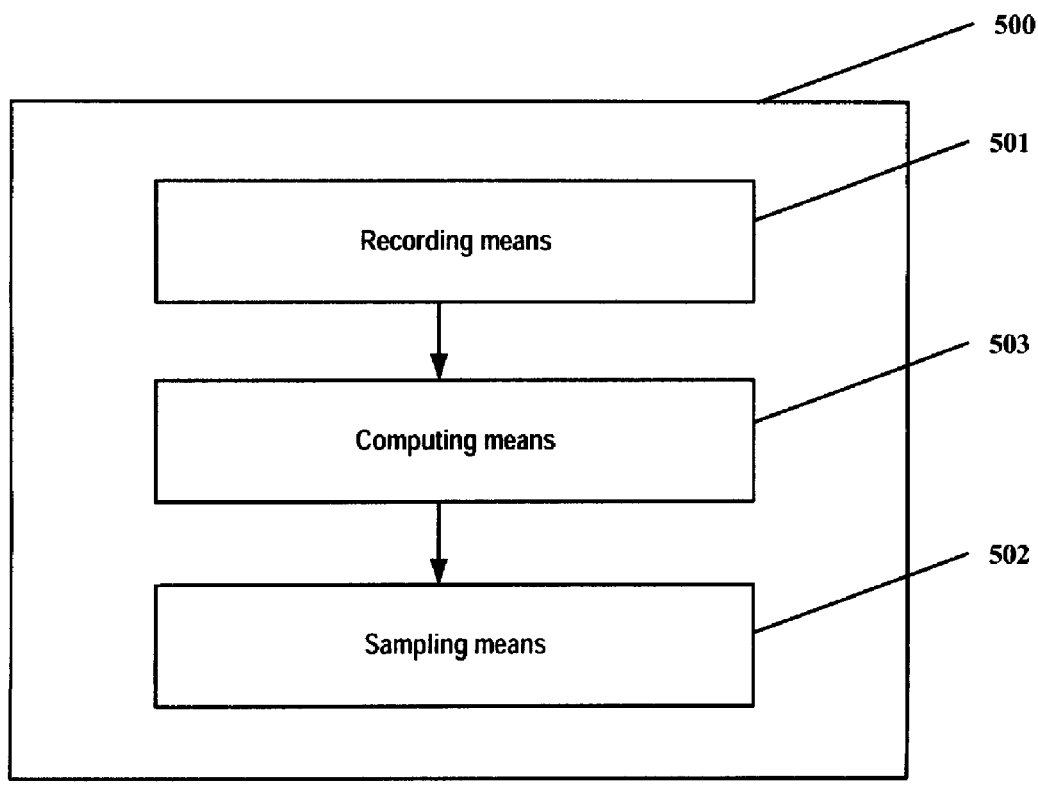
FIG. 5 shows a block diagram of a system for sampling input data according to another embodiment of the present invention.

In addition, FIG. 5 shows a system 500 for sampling the input data according to another embodiment of the present invention. As shown in FIG. 5, a system 500 includes: recording means 501, corresponding to the recording means 401 in FIG. 4, configured for recording execution paths of input data for an operation module in an online running application; sampling means 502, corresponding to the sampling means 402 in FIG. 4, configured for sampling the input data based on the execution paths of the input data, so as to form a data set including the sampled input data. Different from the system 400 as shown in FIG. 4, the system 500 in FIG. 5 further includes computing means 503 configured for computing the CVEP of each input data based on the execution path of the input data, wherein the execution path is represented by a CVEP uniquely identifying the execution path. In FIG. 5, the previously mentioned buffer means is omitted.

About the specific operations of the recording means 401, 501, sampling means 402, 502, and the computing means 503 in the above embodiments, please refer to the above descriptions on each step of the method of the present invention with reference to FIGS. 1 to 3.

By virtue of the system provided by the present invention, the input data can be sampled based on the execution path, so as to automatically form a data set for debugging, for example. Thus, with respect to the prior art, it improves the work efficiency and enhances the effectiveness of the test suite. Moreover, the obtained test suite is more suitable for the circumstance of practical application. Besides, the obtained test suite can be provided to the offline running application for debugging. Thus, it can implement debugging the operation module without stopping the online application.

Hereinafter, reference will be made to FIG. 6 to describe a computer device in which the present invention can be implemented. FIG. 6 schematically shows a structural block diagram of a computing device configured to implement the embodiments according to the present invention.

The computer system as shown in FIG. 6 includes a CPU (Central Processing Unit) 601, a RAM (Random Access Memory) 602, a ROM (Read Only Memory) 603, a system bus 604, a hard disk controller 605, a keyboard controller 606, a serial interface controller 607, a parallel interface controller 608, a display controller 609, a hard disk 610, a keyboard 611, a serial peripheral device 612, a parallel peripheral device 613 and a display 614. Among these components, connected to the system bus 604 are the CPU 601, the RAM 602, the ROM 603, the hard disk controller 605, the keyboard controller 606, the serial interface controller 607, the parallel interface controller 608 and the display controller 609. The hard disk 610 is connected with the hard disk controller 605; the keyboard 611 is connected with the keyboard controller 606; the serial peripheral device 612 is connected with the serial interface controller 607; the parallel peripheral device 613 is connected with the parallel interface controller 608; and the display 614 is connected with the display controller 609.

The structural block diagram in FIG. 6 is shown only for illustration purpose, and is not intended to limit the present invention. In some cases, some devices can be added or reduced as required.

Further, the embodiments of the present invention can be implemented in software, hardware, or the combination thereof. The hardware part can be implemented by a special logic; the software part can be stored in a memory and executed by a proper instruction execution system such as a microprocessor or a dedicatedly designed hardware.

While the embodiments of the present invention considered have been referred to describe this invention, it should be understood that this invention should not be limited to the embodiments disclosed herein. On the contrary, all modifications and equivalent arrangements that come within the spirit and range of the appended claims are intended to be embraced therein. The scope of the appended claims is accorded with the broadest interpretation to encompass all such modifications and equivalent structures and functions.

What is claimed is:

1. A method for sampling input data, comprising the steps of:
   buffering the input data;
   recording an execution path of the buffered input data in an online operation module;
   determining whether the buffered input data passes through a desired execution path; and
   sampling the buffered input data to a data set, in response to the buffered input data passing through the desired execution path.

2. The method according to claim 1, further comprising the step of:
   taking an execution path with relatively lower appearing frequency as the desired execution path.

3. The method according to claim 1, further comprising the steps of:
   sampling, with a relatively higher sampling weight, input data which pass through a desired execution path with a relatively lower appearing frequency; and
   sampling, with a relatively lower sampling weight, input data which pass through a desired execution path with a relatively higher appearing frequency.

4. The method according to claim 1, further comprising the step of:
   sampling newer input data among input data which pass through a same desired execution path with a relatively high sampling priority.

5. The method according to claim 1, wherein recording the execution path of the buffered input data in an online operation module comprises the step of:
   computing a Characteristic Value of Execution Path (CVEP) of the execution path of the input data in the online operation module, wherein the CVEP uniquely identifies the execution path.

6. The method according to claim 1, wherein the data set is provided to an offline version of the online operation module, for debugging the operation module with the data set.

7. The method according to claim 1, wherein the online operation module is an operation module of a streaming application.

8. The method according to claim 1, further comprising the step of:
   adjusting granularity for recording an execution path of input data.

9. The method according to claim 8, wherein adjusting the granularity for recording the execution path of input data comprises the step of:
   adjusting the granularity for recording the execution path of input data for a particular execution path.

10. The method according to claim 9, wherein adjusting the granularity for recording the execution path of input data for the particular execution path comprises the step of:
    dynamically adjusting the granularity for recording the execution path based on the amount of input data which pass through the execution path.

11. A system for sampling input data, comprising:
    buffering means for buffering input data;
    recording means for recording an execution path of the buffered input data in an online operation module; and
    sampling means for determining whether the buffered input data passes through a desired execution path;
    wherein in response to the buffered input data passing through the desired execution path, the buffered input data is sampled to a data set.

12. The system according to claim 11, further comprising:
    means for taking an execution path with relatively lower appearing frequency as the desired execution path.

13. The system according to claim 11, further comprising:
    means for sampling, with a relatively higher sampling weight, input data which pass through a desired execution path with a relatively lower appearing frequency, and sampling, with a relatively lower sampling weight, input data which pass through a desired execution path with a relatively higher appearing frequency.

14. The system according to claim 11, further comprising:
    means for sampling newer input data among input data which pass through a same desired execution path with a relatively high sampling priority.

15. The system according to claim 11, wherein the recording means comprises:
    computing means for computing a Characteristic Value of Execution Path (CVEP) of the execution path of the input data in the online operation module, wherein the CVEP uniquely identifies the execution path.

16. The system according to claim 11, wherein the data set is provided to an offline version of the online operation module, for debugging the operation module with the data set.

17. The system according to claim 11, wherein the online operation module is an operation module of a streaming application.

18. The system according to claim 17, further comprising:
    means for adjusting granularity for recording an execution path of input data.

19. The system according to claim 18, wherein the means for adjusting the granularity for recording the execution path of input data comprises means for adjusting the granularity for recording the execution path of input data for a particular execution path.

20. The system according to claim 19, wherein the means for adjusting the granularity for recording the execution path of input data for the particular execution path comprises means for dynamically adjusting the granularity for recording the execution path based on the amount of input data which pass through the execution.

* * * * *